United States Patent
Hirota et al.

(10) Patent No.: US 8,432,664 B2
(45) Date of Patent: Apr. 30, 2013

(54) SEALING MEMBER FOR CAPACITOR AND ALUMINUM ELECTROLYTIC CAPACITOR USING THE SAME

(75) Inventors: Kiyoshi Hirota, Osaka (JP); Yuichiro Tsubaki, Kyoto (JP); Katsufumi Shimanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/387,161

(22) PCT Filed: Aug. 8, 2011

(86) PCT No.: PCT/JP2011/004487
§ 371 (c)(1),
(2), (4) Date: Jan. 26, 2012

(87) PCT Pub. No.: WO2012/023257
PCT Pub. Date: Feb. 23, 2012

(65) Prior Publication Data
US 2012/0250226 A1     Oct. 4, 2012

(30) Foreign Application Priority Data
Aug. 20, 2010  (JP) ................................ 2010-184604

(51) Int. Cl.
*H01G 9/10*    (2006.01)
(52) U.S. Cl.
USPC ........... 361/518; 361/517; 361/519; 361/535; 361/536; 361/538

(58) Field of Classification Search .................. 361/518, 361/517, 519, 520, 529, 530, 535, 536, 537, 361/538
See application file for complete search history.

(56) References Cited

U.S. PATENT DOCUMENTS
6,128,179 A * 10/2000 Morokuma ................... 361/517
(Continued)

FOREIGN PATENT DOCUMENTS
JP           55-55514           4/1980
JP           63-164209          7/1988
(Continued)

OTHER PUBLICATIONS

Japanese version of International Search Report of PCT Application No. PCT/JP2011/004487 dated Jan. 11, 2011.

*Primary Examiner* — Nguyen T Ha
(74) *Attorney, Agent, or Firm* — Panasonic Patent Center

(57) ABSTRACT

A cylindrical sealing member for a capacitor has a circular first plane and a circular second plane placed oppositely to the first plane, and is provided with two lead holes that penetrate the first and second planes. This sealing member for a capacitor contains butyl rubber, and inorganic material oblate particles having flat surfaces. The sealing member includes a first portion, and a second portion in the vicinity of an outer circumference of the sealing member as well as in the vicinity of the two lead holes. In the first portion, the inorganic material oblate particles are scattered such that flat surfaces thereof are oriented substantially in parallel with the first plane. In the second portion, the inorganic material oblate particles are scattered such that the flat surfaces thereof are oriented substantially perpendicularly to the first plane.

6 Claims, 7 Drawing Sheets

U.S. PATENT DOCUMENTS

| | | | |
|---|---|---|---|
| 6,839,222 B2 * | 1/2005 | Takaoka et al. | 361/512 |
| 6,853,537 B2 * | 2/2005 | Ishii | 361/512 |
| 6,970,343 B2 * | 11/2005 | Hayashi et al. | 361/504 |
| 7,262,953 B2 * | 8/2007 | Ozawa et al. | 361/503 |
| 7,948,740 B2 * | 5/2011 | Funahashi et al. | 361/523 |
| 8,184,429 B2 * | 5/2012 | Yamane et al. | 361/520 |
| 8,243,421 B2 | 8/2012 | Fujimoto | 361/511 |
| 8,363,385 B2 * | 1/2013 | Yoshimitsu | 361/523 |

FOREIGN PATENT DOCUMENTS

| | | |
|---|---|---|
| JP | 07-249552 | 9/1995 |
| JP | 11-288853 | 10/1999 |
| JP | 2000-294464 | 10/2000 |
| JP | 2003-282373 | 10/2003 |
| JP | 2008-024882 | 2/2008 |
| JP | 2008-251980 | 10/2008 |
| JP | 2009-088277 | 4/2009 |

* cited by examiner

SEALING MEMBER FOR CAPACITOR AND ALUMINUM ELECTROLYTIC CAPACITOR USING THE SAME

TECHNICAL FIELD

The present invention relates to a sealing member for use in an aluminum electrolytic capacitor and an aluminum electrolytic capacitor using the sealing member.

BACKGROUND ART

An aluminum electrolytic capacitor includes a capacitor element serving as a functional unit. The capacitor element is composed of an anode foil and a cathode foil, both made of aluminum foils, which are wound with a separator interpolated therebetween. Lead terminals are preliminarily secured to the anode foil and the cathode foil, respectively. A rubber sealing member is attached to the lead terminals, and after the separator has been impregnated with an electrolytic solution, the capacitor element is inserted into a cylindrical metal case having a bottom, and by tightly sealing the opening of the metal case with the sealing member attached thereto, an aluminum electrolytic capacitor is manufactured.

Since the characteristics of the aluminum electrolytic capacitor are closely related to an electrolytic solution to be used therein, it is necessary to properly select the electrolytic solution in order to improve the characteristics thereof. In particular, in the electrolytic solution, there have been demands for high conductivity and a long-term reliability for use under high temperatures, and an electrolytic solution prepared by dissolving an organic acid serving as a solute in a solvent mainly composed of γ-butyrolactone has been used.

However, γ-butyrolactone is a highly volatile material. Consequently, in the case using a sealing member made from natural rubber, ethylene-propylene-diene terpolymer or the like, the electrolytic solution permeates and drifts away as vapor. Therefore, it is difficult to properly maintain performance of the aluminum electrolytic capacitor in a high-temperature environment.

For this reason, there has been used a sealing member made from butyl rubber composed of a copolymer of isobutylene and isoprene, which reduces the amount of permeation and scattering of the electrolytic solution and exerts superior air-tightness. Moreover, with respect to the adhesion between the lead wire and the wall of the through hole and long life under high temperatures, it has been proposed to use a sealing member that is mainly composed of a three-component copolymer (partially cross-linked butyl rubber) of isobutylene, isoprene and divinylbenzene, and is obtained by subjecting this to peroxide cross-linking (Patent Literature 1).

Moreover, it has been proposed to form an inorganic thin film on the surface of a rubber sealing member, and to add oblate fine particles having a predetermined specific surface area as a filler for the rubber sealing member, so that heat resistance is improved so as to reduce evaporation/volatilization of the electrolytic solution (Patent Literatures 2 and 3).

Furthermore, in recent years, environmental problems have been attracting much attention, and upon assembling electronic parts, a lead-free soldering process has been applied. In order to allow an aluminum electrolytic capacitor to withstand such a working temperature of soldering, a structure has been proposed in which mica is added to the sealing member as a filler (Patent Literatures 4 and 5).

However, in a conventional aluminum electrolytic capacitor, in the case where a sealing member of partially cross-linked butyl rubber is used, or in the case where an elastic sealing member obtained by subjecting partially cross-linked butyl rubber to peroxide cross-linking is used, upon carrying out a life test at high temperatures, an electrolytic solution tends to be easily leaked near a through hole for a lead wire of the elastic sealing member.

Moreover, in the case where an inorganic thin film is formed on the surface of a rubber sealing member, or in the case where oblate fine particles having a predetermined specific surface area are added thereto as a filler for the rubber sealing member, evaporation/volatilization of an electrolytic solution can be reduced. However, in contrast to a prolonged capacitor life of 2000 hours to 10000 hours at 105° C., the rubber sealing member allows the electrolytic solution to permeate therethrough, failing to reduce evaporation/volatilization of the electrolytic solution.

CITATION LIST

Patent Literatures

PTL 1 Unexamined Japanese Patent Publication No. H07-249552
PTL 2 Unexamined Japanese Patent Publication No. 2003-282373
PTL 3 Unexamined Japanese Patent Publication No. 2008-251980
PTL 4 Unexamined Japanese Patent Publication No. H11-288853
PTL 5 Unexamined Japanese Patent Publication No. 2000-294464

SUMMARY OF THE INVENTION

The present invention relates to an aluminum electrolytic capacitor using a sealing member for a capacitor, which can reduce evaporation/volatilization of an electrolytic solution under high temperatures over a long time, with high reliability.

The sealing member for a capacitor of the present invention, which has a cylindrical shape, is provided with a circular first plane and a circular second plane placed on a side opposite to the first plane, with two lead holes that penetrate the first and second planes. The sealing member for a capacitor contains butyl rubber and inorganic material oblate particles having flat surfaces. The sealing member further includes a first portion, and a second portion located in the vicinity of an outer circumference of the sealing member and in the vicinity of the two lead holes. In the first portion, the inorganic material oblate particles are scattered in the first portion such that the flat surfaces thereof are oriented substantially in parallel with the first plane. In the second portion, the inorganic material oblate particles are scattered in the first portion such that the flat surfaces of the inorganic material oblate particles are oriented substantially perpendicularly to the first plane.

Moreover, an aluminum electrolytic capacitor in accordance with the present invention has a capacitor element, an electrolytic solution with which the capacitor element is impregnated, a cylindrical metal case having a bottom which houses the capacitor element together with the electrolytic solution, and the above-mentioned sealing member that seals the opening of the case. The capacitor element is formed by winding an anode foil and a cathode foil with the separator interpolated therebetween.

Since the sealing member of the present invention has the above-mentioned structure, the inorganic material oblate particles block permeation of vapor of the electrolytic solution when the sealing member is used for the aluminum electrolytic capacitor, thereby making the electrolytic solution hardly permeating in the longitudinal directions as well as in the side face directions of the sealing member. As a result, it becomes possible to suppress evaporation/volatilization of the electrolytic solution. That is, it is possible to provide an aluminum electrolytic capacitor having a long life even under high temperatures.

DESCRIPTION OF EMBODIMENTS

First Exemplary Embodiment

Figure 1:
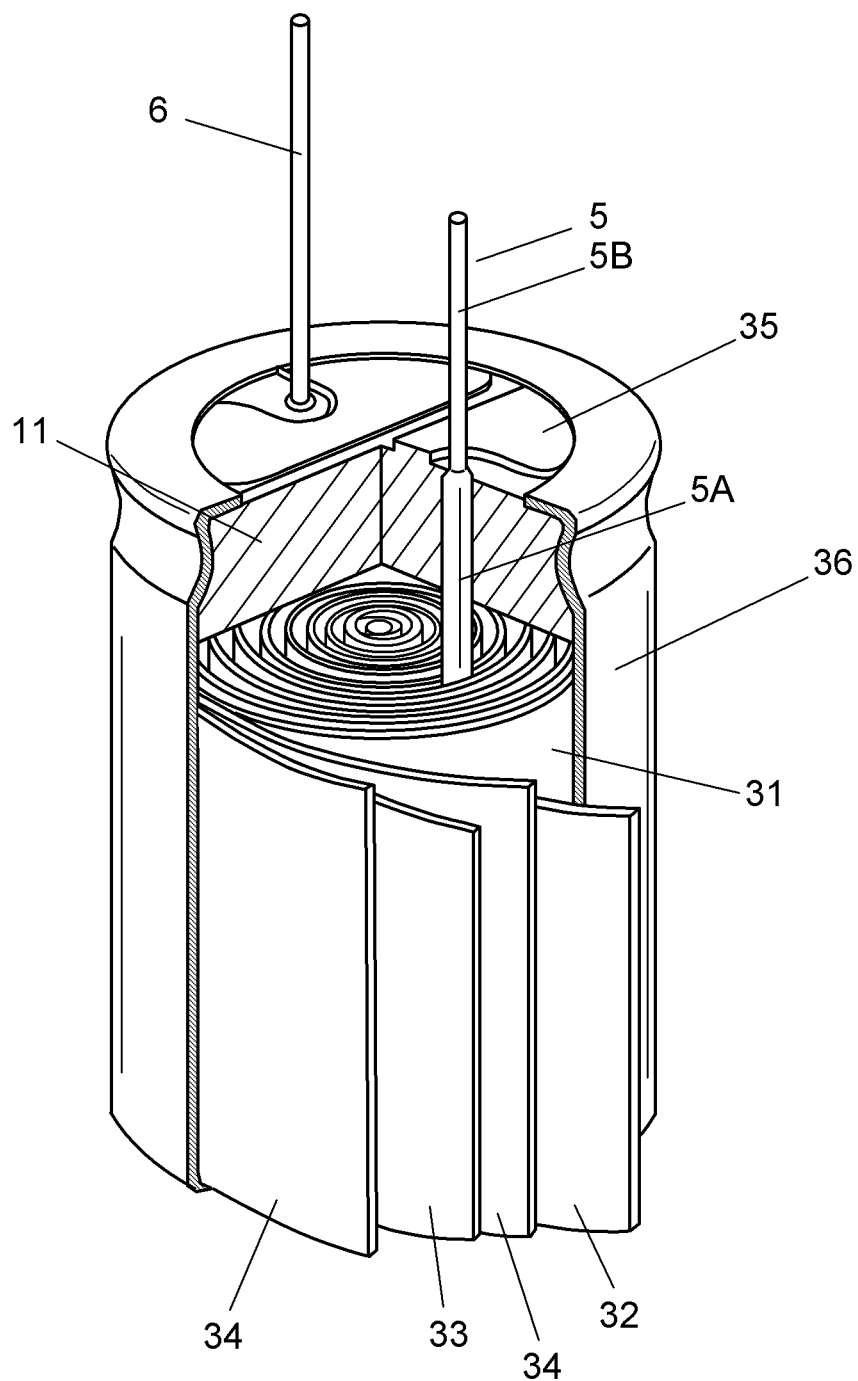
FIG. 1 is a perspective view of an aluminum electrolytic capacitor in accordance with a first exemplary embodiment of the present invention.

FIG. 1 is a perspective view of an aluminum electrolytic capacitor in accordance with the first exemplary embodiment of the present invention. Capacitor element 31 is composed of anode foil 32 and cathode foil 33, both made of aluminum foils, that are wound with separator 34 interpolated therebetween. Lead wire 5 is joined to anode foil 32. Lead wire 5 has joining portion 5A joined to anode foil 32 and external lead-out portion 5B that can be soldered. Lead wire 6 is jointed to cathode foil 33. In the same manner, lead wire 6 also has a joining portion and an external lead-out portion.

Capacitor element 31 is impregnated with an electrolytic solution (not shown), and is housed in cylindrical case 35 made of aluminum and having a bottom. The opening of case 35 is sealed with sealing member 11. The outer circumference of case 35 is covered with exterior member 36.

The electrolytic solution is prepared by dissolving an electrolyte salt in a solvent. The solvent is selected from the group consisting of ethylene glycol, γ-butyrolactone, propylene carbonate, sulfolane, water and mixtures thereof. The electrolyte salt is selected from the group consisting of organic acids, inorganic acids, ammonium salts of organic acids or inorganic acids, primary to quaternary ammonium salts, imidazolium salts and imidazolinium salts, derivatives of these and mixtures thereof.

Examples of the organic acids or inorganic acids include: organic acids such as formic acid, acetic acid, propionic acid, maleic acid, citraconic acid, phthalic acid, adipic acid, azelaic acid, benzoic acid, butyloctanic acid, formic acid, and decane dicarboxylic acid, and inorganic acids such as boric acid and phosphoric acid. Moreover, primary to quaternary ammonium salts of these may be used.

Examples of the imidazolium salt, imidazolinium salt, and derivatives thereof include: imidazoline compounds, imidazole compounds, benzoimdazole compounds, and alicylic pyrimidine compounds that are quaternized by an alkyl group or an arylalkyl group having 1 to 11 carbon atoms. Specific preferable examples thereof include: 1-methyl-1,8-diazabicyclo[5,4,0]undecene-7,1-methyl-1,5-diazabicyclo[4,3,0]nonene-5,1,2,3-trimethylimidazolinium, 1,2,3,4-tetramethyl imidazolinium, 1,3-dimethyl-2-ethyl-imidazolinium, 1,3,4-trimethyl-2-ethylimidazolinium, 1,3-dimethyl-2-heptyl imidazolinium, 1,3-dimethyl-2-(-3' heptyl)imidazolinium, 1,3-dimethyl-2-dodecyl imidazolinium, 1,2,3-trimethyl-1,4,5,6-tetrahydro pyrimidium, 1,3-dimethylimidazolium and 1,3-dimethylbenzoimidazolium. Since each of these has a high electric conductance, it becomes possible to produce an aluminum electrolytic capacitor having a low loss.

Moreover, a conductive polymer layer may be formed on capacitor element 31 by forming a conductive polymer such as polypyrrole, polythiophene or polyaniline through electrolytic polymerization or chemical polymerization. In this case, the conductive polymer layer functions as a solid electrolyte together with the electrolytic solution. It is possible to manufacture a chip-type aluminum electrolytic capacitor that is stable even at solder reflow temperatures and has a low ESR with this structure.

Figure 2A:
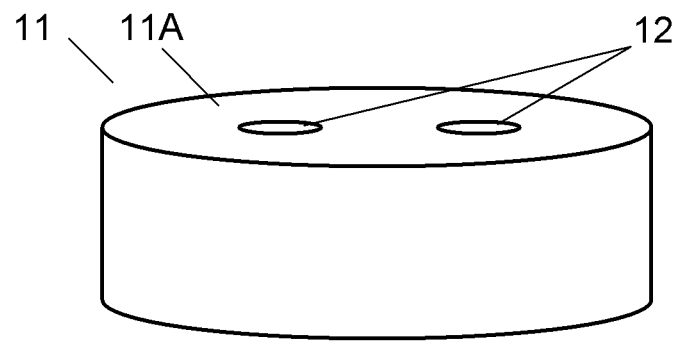
FIG. 2A is a perspective view of a sealing member of the aluminum electrolytic capacitor shown in FIG. 1.

Next, the following description will describe sealing member 11 in detail. FIG. 2A is a perspective view of sealing member 11 serving as a sealing member for a capacitor in accordance with the present embodiment.

Figure 2B:
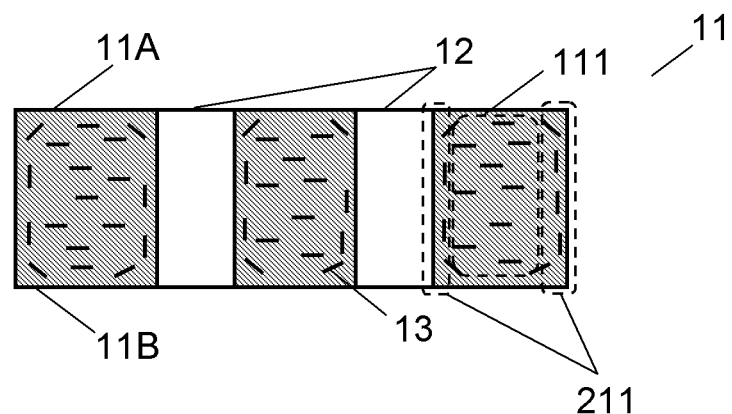
FIG. 2B is a schematic view that illustrates a cross section of the sealing member shown in FIG. 2A.

FIG. 2B is a schematic cross-sectional view of sealing member 11. Sealing member 11 has a cylindrical shape, and is provided with circular first plane 11A and circular second plane 11B on the side opposite to first plane 11A. Two lead holes 12 that penetrate first plane 11A and second plane 11B are provided therein.

Sealing member 11 contains butyl rubber and inorganic material oblate particles 13 having flat surfaces. Sealing member 11 has first portion 111 and second portion 211 that is located in the vicinity of the outer circumference of sealing member 11 and in the vicinity of two lead holes 12. In first portion 111, inorganic material oblate particles 13 are scattered such that flat surfaces thereof are oriented substantially in parallel with first plane 11A. In second portion 211, inorganic material oblate particles 13 are scattered such that flat surfaces thereof are oriented substantially perpendicularly to the first plane.

In first portion 111, when the angle made by the flat surfaces of each of inorganic material oblate particles 13 with first plane 11A is an angle of 75° or less (0° or more and 75° or less, or 105° or more and 180° or less), this structure provides a sufficient effect. More preferably, the angle is 45° or less, and further preferably 30° or less. Moreover, in second portion 211, when the angle made by the flat surfaces of each of inorganic material oblate particles 13 with first plane 11A is an angle of 15° or more, this structure provides a sufficient effect. More preferably, the angle is 45° or more, further preferably, 60° or more.

Additionally, it is only necessary to have some flat surfaces of inorganic material oblate particles 13 that are oriented substantially perpendicularly to the plane of sealing member 11 in at least some portion in the vicinity of the outer circumference of sealing member 11 and in the vicinity of two lead holes 12. That is, in second portion 211, not all of inorganic material oblate particles 13 are necessarily required to be oriented substantially perpendicularly to the plane of sealing member 11. There may be some portions that are oblique to the plane of sealing material 11, and located in a scattered manner.

As inorganic material oblate particles 13, natural mica is preferably used, and the average particle size thereof measured by a laser diffraction method (particle size distribution measuring device/SALD-2200, manufactured by Shimadzu Corporation) preferably ranges from 20 µm to 50 µm, inclusive. Moreover, the aspect ratio thereof measured by a flow-type particle image analyzing method (flow-type particle image analyzer FPIA-3000 manufactured by Sysmex Corporation) preferably ranges from 0.5 to 0.7, inclusive. In the case where the material out of these ranges is used, problems tend to arise in dispersibility, thickening property, and the like at the time of a primary molding process, which will be described later. As a result, the effect of reducing evaporation/volatilization of the electrolytic solution under high temperatures over a long time is lowered.

The aspect ratio is defined as a value obtained by dividing the particle short-axis length by the particle long-axis length. In the case where the average particle size is less than 20 µm, it is not possible to prevent permeation of vapor of the electrolytic solution. Moreover, in the case where the average particle size exceeds 50 µm, it is not possible to properly maintain the strength of sealing member 11.

Butyl rubber is rubber having a small unsaturation degree, and is obtained by co-polymerizing isobutylene and a small amount of isoprene through cationic polymerization. In addition to the normal butyl rubber (IIR) made from the copolymer of isobutylene and isoprene, there are halogenated butyl rubbers, such as chlorinated butyl rubber (CIIR) and brominated butyl rubber (BIIR), and partially cross-linked butyl rubbers using divinyl benzene, and the like. From the viewpoint of preventing corrosion of metal members, such as case 35 and lead wires 5 and 6 as well as cathode foil 33, normal butyl rubber (IIR) and partially cross-linked butyl rubber are preferably used.

Examples of the cross-linking agent for butyl rubber include a resin cross-linking agent, a sulfur cross-linking agent, a quinoid cross-linking agent and a sulfur donor cross-linking agent.

When an alkyl phenol formaldehyde resin is used as the resin cross-linking agent, resistance against the electrolytic solution and heat resistance of sealing member 11 can be improved. From the viewpoint of preventing corrosion of the metal members, it is preferable to avoid the use of resins containing sulfur and bromine atoms.

It is preferable to add inorganic filler to sealing member 11. That is, sealing member 11 preferably also contains inorganic filler. As the inorganic filler, silica that has been subjected to a silane coupling treatment or a silicone oil treatment, and clay that has been subjected to a silane coupling treatment are preferably used.

By carrying out such a surface treatment, the dispersibility of the inorganic filler in the butyl rubber at the time of kneading can be enhanced. Thus, upon roll pressing at the time of a roll-pressing step of a kneaded matter, the particles of the inorganic filler and inorganic material oblate particles 13 can be filled uniformly and substantially in parallel with the upper and lower surfaces of sealing member 11. Moreover, it is possible to provide superior adhesion among the butyl rubber, inorganic material oblate particles 13 and the inorganic filler. As a result, when sealing member 11 is used for an aluminum electrolytic capacitor, it becomes possible to manufacture an aluminum electrolytic capacitor having high reliability with a long life at high temperatures.

In this case, it is preferable to blend inorganic material oblate particles 13 at a ratio from 40 parts by weight to 120 parts by weight, inclusive, and the inorganic filler at a ratio from 30 parts by weight to 80 parts by weight, inclusive, relative to 100 parts by weight of the butyl rubber. These compounding ratios make it possible to improve the dispersibility in the butyl rubber and also to obtain a thickening suppression effect. Moreover, upon roll pressing, the inorganic filler functions to orient inorganic material oblate particles 13 in parallel with the upper and lower surfaces of sealing member 11 as well as the adhesion between the butyl rubber and inorganic material oblate particles 13 can be improved.

As additives other than the inorganic filler, a single or a combination of two kinds or more of carbon blacks indicated by grade names of SAF, ISAF, HAF, MAF, GPF, SRF, FT, MT, and the like can be used. The carbon black is preferably blended in 100 parts by weight of the butyl rubber at a ratio from 30 parts by weight to 100 parts by weight, inclusive, more preferably, at a ratio from 50 parts by weight to 80 parts by weight, inclusive. This blending ratio allows the carbon black to enter the cross-linked butyl rubber so that sealing member 11 can be hardened.

Moreover, although sealing member 11 exhibits superior heat resistance and weather resistance without using an antioxidant, the life of sealing member 11 can be prolonged by using the antioxidant.

Examples of the antioxidant include: aromatic secondary amine-based stabilizers such as phenylbutyl amine and N,N'-di-2-naphthyl-p-phenylene diamine; phenol-based stabilizers such as dibutylhydroxy toluene and tetrakis[methylene-3 (3,5-di-t-butyl-4-hydroxyphenyl)cinnamate]methane; thioether-based stabilizers such as bis[2-methyl-4-(3-n-alkylthiopropionyloxy)-5-t-butylphenyl]sulfide; and dithiocarbamate-based stabilizers such as nickel dibutyldithiocarbamate. One of these antioxidants may be used alone, or two or more kinds of these may be used in combination, and with respect to 100 parts by weight of the butyl rubber, the blending ratio of the antioxidants is normally set in a range from 0.1 parts by weight to 5 parts by weight, inclusive, more preferably, in a range from 0.5 parts by weight to 3 parts by weight, inclusive.

Moreover, a processing aid may be added thereto on demand. As the processing aid, processing aids to be used for normal rubber processing may be used. Examples of the processing aid include: higher fatty acids such as recinoleic acid, stearic acid, palmitic acid and lauric acid; higher fatty acid salts such as barium stearate, calcium stearate and zinc stearate; and higher fatty acid esters such as recinoleic acid ester, stearic acid ester, palmitic acid ester and lauric acid ester. These processing aids are blended into 100 parts by weight of the butyl rubber normally at a ratio of 10 parts by weight or less, more preferably at a ratio from 1 part by weight to 5 parts by weight, inclusive.

The following description will describe a method for producing sealing member 11. The producing method of sealing member 11 in the present embodiment includes (1) mixing and kneading a material containing at least butyl rubber, inorganic material oblate particles 13 and a cross-linking agent, (2) roll-pressing the kneaded matter into a sheet such that the flat surfaces of inorganic material oblate particles 13 are oriented substantially in parallel with the plane of the sheet, (3) placing the sheet on a lower mold with pins protruding from a bottom surface of a concave portion having a cylindrical shape, and pressing an upper mold onto the sheet so that one portion of the sheet is pushed into the concave portion of the lower mold, and the sheet is press-molded to be primarily cross-linked, and (4) removing the molded matter that has been primarily cross-linked from the molds and heating the molded matter so as to be secondarily cross-linked. By using the procedure, cylindrical sealing member 11 with two through holes (lead holes 12) therein can be formed.

In the kneading step, the materials, such as the butyl rubber, inorganic material oblate particles 13, the cross-linking agent, the inorganic filler, the carbon black, and the antioxidant, are mixed and kneaded with one another by using a conventionally known method, such as a Banbury mixer, a pressure kneader, or an open roller.

In the roll-pressing step, the kneaded matter thus prepared is rolled into a sheet. For example, a sheet having a thickness in a range from 0.5 mm or more to 10 mm or less is formed by using an open roller. By forming the sheet to have a predetermined thickness, the flat surfaces of inorganic material oblate particles 13 are oriented substantially in parallel with the upper and lower surfaces of the sheet.

Figure 3:
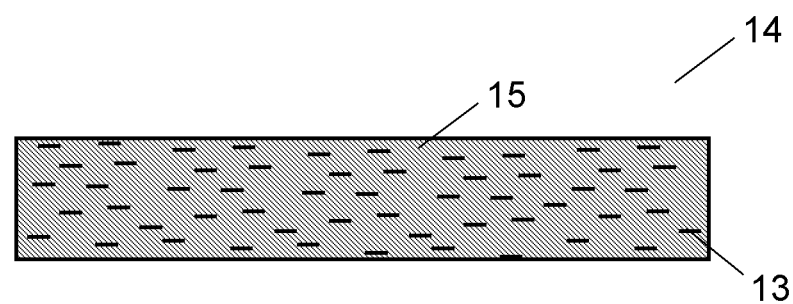
FIG. 3 is a schematic view that illustrates a cross section of a sheet for use in manufacturing the sealing member shown in FIG. 2A.

FIG. 3 is a schematic view that illustrates the cross section of sheet 14 that has been rolled. Sheet 14 is mainly composed of butyl rubber 15, and inorganic material oblate particles 13 are dispersed such that the flat surfaces thereof are oriented substantially in parallel with the upper and lower surfaces of sheet 14. In the case where the thickness of sheet 14 is less than 0.5 mm, a problem may be raised in moldability, while in the case where the thickness exceeds 10 mm, it becomes difficult to orient the flat surfaces of inorganic material oblate particles 13 substantially in parallel with the upper and lower surfaces of sheet 14.

Figure 4A:
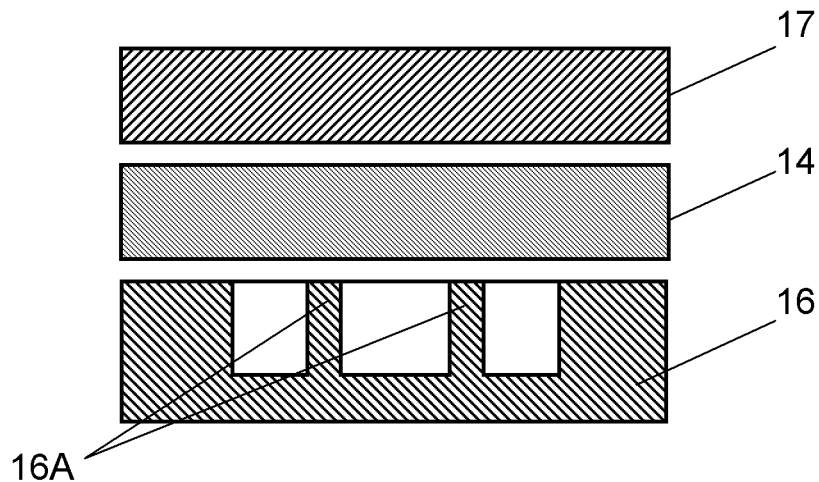
FIG. 4A is a schematic view showing a press molding step of a sealing member for a capacitor in accordance with the first exemplary embodiment of the present invention.
Figure 4B:
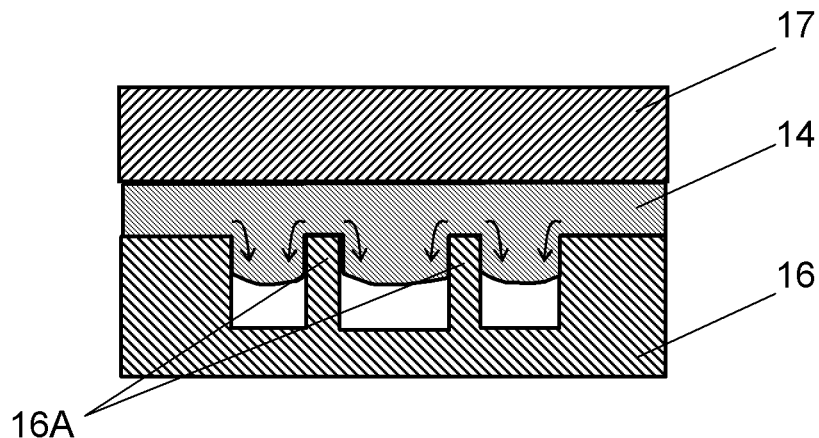
FIG. 4B is a schematic view showing a sequence of forming processes of the sealing member for a capacitor that follows the processes of FIG. 4A.
Figure 4C:
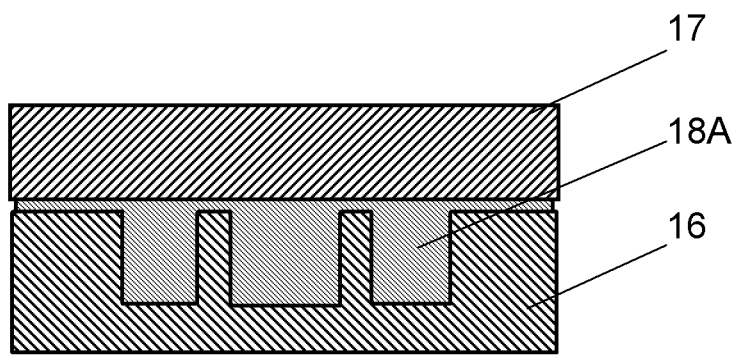
FIG. 4C is a schematic view showing a sequence of forming processes of the sealing member for a capacitor that follows the processes of FIG. 4B.

In the molding step, the rolled sheet 14 is press-molded into a cylindrical shape with two lead holes 12 formed therein and primarily cross-linked. FIGS. 4A to 4C illustrate a specific press-molding method. FIGS. 4A to 4C are schematic views that illustrate a press-molding step of sealing member 11 in the present embodiment.

As shown in FIG. 4A, lower mold 16 which has a concave portion having a cylindrical shape with two pins 16A protruding from its bottom surface, and upper mold 17 having a plane are used in the press-molding step. Rolled sheet 14 is placed between lower mold 16 and upper mold 17. Lower mold 16 and upper mold 17 are preliminarily adjusted to a predetermined temperature.

Next, as shown in FIG. 4B, sheet 14 placed between lower mold 16 and upper mold 17 is pressed. At this time, portions of sheet 14 are allowed to flow along the side walls of lower mold 16 as indicated by arrows, and pushed into lower mold 16.

Sheet 14 is allowed to flow in this manner so that inorganic material oblate particles 13 are scattered such that flat surfaces of inorganic material oblate particles 13 are oriented substantially perpendicularly to the plane of molded body 18A in the vicinity of the outer circumference of molded body 18A as well as in the vicinity of the two lead holes while flat surfaces have been oriented substantially in parallel with the upper and lower surfaces of sheet 14.

On the other hand, portions of sheet 14 in the vicinity of contact portions with upper mold 17 are hardly allowed to flow so that the flat surfaces of inorganic material oblate particles 13 are kept substantially in parallel with the plane of molded body 18A. In the vicinity of the outer circumference of molded body 18A as well as in the vicinity of the lead holes, inorganic material oblate particles 13 are pushed therein in parallel with the wall surfaces of lower mold 16 such that the flat surfaces of inorganic material oblate particles 13 are made substantially perpendicularly to the plane of molded body 18A.

Meanwhile, although there are also some partial portions in which the flat surfaces of inorganic material oblate particles 13 are made oblique to the plane of molded body 18A in the vicinity of the outer circumference of molded body 18A as well as in the vicinity of the two lead holes, these portions give no influences to the characteristics.

As shown in FIG. 4C, sheet 14 is filled into the cylindrical shape of lower mold 16 so that two holes are simultaneously formed in the cylindrical shape. Moreover, since lower mold 16 and upper mold 17 have a predetermined temperature, butyl rubber is primarily cross-linked as well as sheet 14 is pressed by upper mold 16 and lower mold 17, and the flat surfaces of inorganic material oblate particles 13 are fixed.

In this manner, sheet 14 is placed on lower mold 16 having a cylindrical concave portion with pins 16A protruding from the bottom surface thereof, and upper mold 17 is pressed onto sheet 14 so that sheet 14 is pushed into lower mold 16. With this operation, sealing member 11 is allowed to have a first portion in which inorganic material oblate particles 13 are scattered and flat surfaces thereof are oriented substantially in parallel with the plane of molded body 18A, and a second portion in which inorganic material oblate particles 13 are scattered and the flat surfaces thereof are oriented substantially perpendicularly to the plane of molded body 18A. The second portion is located in the vicinity of the outer circumference of molded body 18A as well as in the vicinity of two lead holes 12.

The thickness of sheet 14 is made equal to the depth of the concave portion of lower mold 16, or less, and is adjusted according to the thickness of molded body 18A to be formed. This adjustment is effective to provide the structure in which inorganic material oblate particles 13 are scattered such that flat surfaces thereof are oriented substantially perpendicularly to the plane of molded body 18A in the vicinity of the outer circumference of molded body 18A as well as in the vicinity of the two lead holes.

In the secondary cross-linking step, heat is further applied to molded body 18A that has been primarily cross-linked. Thus, the reaction between butyl rubber and the cross-linking agent is further advanced so that the excess cross-linking agent can be removed. Moreover, by removing the excess portion of molded body 18A, sealing member 11 is prepared.

The aspect ratio of inorganic material oblate particles 13 that are scattered inside sealing member 11 is set in a range from 0.15 to 0.43, inclusive. As described earlier, prior to the kneading process, the aspect ratio ranges from 0.5 to 0.7, inclusive. Since inorganic material oblate particles 13 are crushed by the kneading step, roll-pressing step and press-molding step by which sealing member 11 is formed, with the result that the aspect ratio becomes smaller. When the aspect ratio is less than 0.15, it is not possible to prevent permeation of vapor of the electrolytic solution. When the aspect ratio exceeds 0.5, air bubbles tend to be easily generated in sealing member 11, with the result that the air tightness of sealing member 11 is hardly maintained. For those reasons, in the kneading step for the materials, it is preferable to use inorganic material oblate particles 13 with particles having an aspect ratio in a range from 0.5 to 0.7, inclusive.

Furthermore, the average particle size of inorganic material oblate particles 13 that are scattered inside sealing member 11 is preferably set in a range from 10 µm to 50 µm, inclusive. The average particle size of inorganic material oblate particles 13 scattered inside sealing member 11 can be measured by processes in which sealing member 11 is heated in the air so that its rubber components are burnt to be removed and the remaining components are evaluated by a laser diffraction method.

As described above, sealing member 11 has a first portion in which inorganic material oblate particles 13 contained in butyl rubber are scattered such that flat surfaces thereof are oriented substantially in parallel with first plane 11A of sealing member 11, and a second portion, located in the vicinity of the outer circumference of sealing member 11 as well as in the vicinity of lead holes 12, where inorganic material oblate particles 13 contained in butyl rubber are scattered such that flat surfaces thereof are oriented substantially perpendicularly to first plane 11A of sealing member 11. With this structure, inorganic material oblate particles 13 of sealing member 11 serve as an obstacle against vapor from the electrolytic solution, with the result that vapor is hardly allowed to permeate in longitudinal directions of sealing member 11 as well as in directions toward the side surfaces thereof. As a result, it becomes possible to further suppress evaporation/volatilization from an electrolytic solution in comparison with a conventional structure, and consequently to provide an aluminum electrolytic capacitor having a long life at high temperatures.

In particular, in the case where γ-butyrolactone is used as an organic solvent, by using sealing member 11 in a life test at temperatures of 100° C. or more, it becomes possible to further suppress evaporation/volatilization from an electrolytic solution in comparison with a conventional structure. That is, it is possible to provide an aluminum electrolytic capacitor having a long life even under high temperatures.

The following description will describe the first exemplary embodiment in detail based upon specific examples.

Examples 1 to 12

Materials for forming sealing members of Examples 1 to 12 in accordance with the present embodiment are shown below: Moreover, compositions (parts by weight) of the respective examples are shown in Table 1.

Butyl rubber (268 manufactured by JSR) is used as a polymer, and an alkyl phenol formaldehyde resin is used as a cross-linking agent. The following five kinds of natural micas are used as inorganic material oblate particles 13. The average particle size of mica A is 20 µm, and the aspect ratio thereof is 0.567. The average particle size of mica B is 23 µm, and the aspect ratio thereof is 0.577. The average particle size of mica C is 25 µm, and the aspect ratio thereof is 0.584. The average particle size of mica D is 30 µm, and the aspect ratio thereof is 0.602. The average particle size of mica E is 50 µm, and the aspect ratio thereof is 0.672. As inorganic filler, silicone oil-treated silica (polysulfide manufactured by Daiso Co., Ltd.) or silane coupling-treated clay (vinylsilane manufactured by BASF Corp.) is used. As a reinforcing agent, carbon blacks (FEF, SRF and FT, manufactured by Tokai Carbon Co., Ltd.) are used. Stearic acid is used as a processing aid, and zinc oxide is used as a cross-linking accelerator aid.

TABLE 1

|  |  | Example 1 | Example 2 | Example 3 | Example 4 | Example 5 | Example 6 | Example 7 |
|---|---|---|---|---|---|---|---|---|
| Butyl rubber (IIR) |  | 100 | 100 | 100 | 100 | 100 | 100 | 100 |
| Alkyl phenol formaldehyde resin |  | 10 | 10 | 10 | 10 | 10 | 10 | 10 |
| Zinc oxide |  | 5 | 5 | 5 | 5 | 5 | 5 | 5 |
| Inorganic material oblate particles | Mica A | — | — | — | — | — | 60 | — |
|  | Mica B | 20 | 30 | 40 | 50 | 60 | — | 60 |
|  | Mica C | — | — | — | — | — | — | — |
|  | Mica D | 20 | 30 | 40 | 50 | 60 | — | — |
|  | Mica E | — | — | — | — | — | — | — |
| Silicone oil-treated silica |  | — | — | — | — | — | 30 | 30 |
| Silane coupling-treated clay |  | 60 | 60 | 60 | 60 | 60 | 30 | 30 |
| Carbon black | FEF | 20 | 20 | 20 | 20 | 20 | 20 | 20 |
|  | SRF | 20 | 20 | 20 | 20 | 20 | 20 | 20 |
|  | FT | 20 | 20 | 20 | 20 | 20 | 20 | 20 |
| Stearic acid |  | 0.5 | 0.5 | 0.5 | 0.5 | 0.5 | 0.5 | 0.5 |

|  |  | Example 8 | Example 9 | Example 10 | Example 11 | Example 12 | Comparative Example 1 |
|---|---|---|---|---|---|---|---|
| Butyl rubber (IIR) |  | 100 | 100 | 100 | 100 | 100 | 100 |
| Alkyl phenol formaldehyde resin |  | 10 | 10 | 10 | 10 | 10 | 10 |
| Zinc oxide |  | 5 | 5 | 5 | 5 | 5 | 5 |
| Inorganic material oblate | Mica A | — | — | — | 30 | — | — |
|  | Mica B | — | — | 30 | — | — | — |

TABLE 1-continued

| particles | Mica C | 60 | — | — | — | — | — |
|---|---|---|---|---|---|---|---|
| | Mica D | — | — | 30 | — | 30 | — |
| | Mica E | — | 60 | — | 30 | — | — |
| Silicone oil-treated silica | | 30 | 30 | 30 | 30 | 30 | 50 |
| Silane coupling-treated clay | | 30 | 30 | 30 | 30 | 30 | 50 |
| Carbon black | FEF | 20 | 20 | 20 | 20 | 20 | 20 |
| | SRF | 20 | 20 | 20 | 20 | 20 | 20 |
| | FT | 20 | 20 | 20 | 20 | 20 | 20 |
| Stearic acid | | 0.5 | 0.5 | 0.5 | 0.5 | 0.5 | 0.5 |

In Table 1, with respect to Examples 1 to 5, the contents of inorganic material oblate particles 13 are changed, and with respect to Examples 6 to 9, by changing the particle sizes of inorganic material oblate particles 13, the aspect ratio thereof is changed. In Examples 10 and 11, natural micas having different particle sizes are mixed therein. Moreover, in Comparative Example 1, the added amount of the filler is increased without adding natural mica.

Materials having compounding ratios indicated in Table 1 are mixed with one another, and kneaded by a pressing kneader (kneading step), and then formed into sheet 14 by an open roller machine (roll-pressing step).

Next, sheet 14 is placed between lower mold 16 and upper mold 17, shown in FIG. 4A, and sheet 14 is pressed by lower mold 16 and upper mold 17, and primarily cross-linked so that molded body 18A is produced (molding step) after lower mold 16 and upper mold 17 are set to a predetermined temperature (180° C.).

Molded body 18A is then taken out of the upper and lower molds, and molded body 18A is heated (at 180° C.) so as to be secondarily cross-linked, and by removing excess portions therefrom, sealing member 11 is produced. Sealing member 11 thus molded has a diameter of 6.2 mm and a height of 1.5 mm, with the diameter of each lead hole 12 set to 0.7 mm.

Next, an aluminum electrolytic capacitor is manufactured by using each of sealing members 11, by a conventionally known method. More specifically, anode foil 32 is prepared by etching an aluminum foil so as to be enlarged in its effective surface area and by forming a dielectric oxide film on the surface by using a chemical treatment. Then, lead wire 5 having a diameter of 0.8 mm in its joining portion 5A is joined to anode foil 32. Cathode foil 33 is prepared by etching an aluminum foil. Lead wire 6 having a diameter of 0.8 mm in its joining portion is then joined to cathode foil 33.

Next, by winding anode foil 32 and cathode foil 33 with separator 34 being interposed therebetween, capacitor element 31 is formed. Then, capacitor element 31, impregnated with an electrolytic solution, is inserted into case 35 made of aluminum, and sealed with sealing member 11 so that an aluminum electrolytic capacitor having a diameter of 6 mm and a height of 8 mm, with a capacity of 240 µF at a rated voltage of 16 V, is manufactured. In this case, the electrolytic solution is a mixture of 75 parts by weight of γ-butyrolactone, 25 parts by weight of 1,2,3,4-tetramethylimidazolium phthalate, and 0.5 parts by weight of nitrobenzoic acid.

An aluminum electrolytic capacitor thus manufactured is subjected to a no-load test at 105° C. for 2000 hours, and its rate of change in capacity, leak current and an amount of permeated electrolytic solution are measured. The results thereof are shown in Table 2. Additionally, the aspect ratio of inorganic material oblate particles 13 is a value obtained by measuring the materials prior to the kneading process by using a flow-type particle image analyzer (FPIA-3000, manufactured by Sysmex Corporation). The aspect ratio of the inorganic material oblate particles on a cross section of the sealing member is a value obtained by measuring the aspect ratio of inorganic material oblate particles 13 on the cross section of sealing member 11 through scanning electron microscopy (SEM) observation. The amount of permeation of the electrolytic solution is measured by calculating a reduction in weight of the aluminum electrolytic capacitor, and indicated by an index obtained when it is supposed that the amount of Comparative Example 1 is 100.

TABLE 2

| | Particle size of inorganic material oblate particles | Aspect ratio of inorganic material oblate particles | Aspect ratio of inorganic material oblate particles on cross section of sealing member | Rate of change in capacity (%) | Leak current (µA) | Ratio of permeation of electrolytic solution |
|---|---|---|---|---|---|---|
| Example 1 | 30 | 0.602 | 0.22 | 16.0 | 7 | 84.5 |
| Example 2 | 30 | 0.602 | 0.22 | 15.0 | 6 | 79.3 |
| Example 3 | 30 | 0.602 | 0.22 | 13.0 | 5 | 74.3 |
| Example 4 | 30 | 0.602 | 0.22 | 11.9 | 4 | 70.0 |
| Example 5 | 30 | 0.602 | 0.22 | 10.3 | 3.1 | 66.0 |
| Example 6 | 20 | 0.567 | 0.15 | 10.0 | 9 | 61.2 |
| Example 7 | 23 | 0.577 | 0.43 | 11.0 | 7 | 62.5 |
| Example 8 | 25 | 0.584 | 0.16 | 10.0 | 5 | 70.6 |
| Example 9 | 50 | 0.672 | 0.50 | 14.0 | 8 | 85.0 |
| Example 10 | 30 | 0.602 | 0.22 | 12.0 | 4 | 74.5 |
| Example 11 | 35 | 0.672 | 0.20 | 14.0 | 8 | 79.3 |
| Example 12 | 37 | 0.602 | 0.17 | 13.0 | 6 | 82.0 |
| Comparative Example 1 | — | — | 0.99 | 43.0 | 18 | 100 |

Table 2 indicates that, by mixing inorganic material oblate particles 13 having an aspect ratio in a range from 0.5 to 0.7, inclusive, as a material for the sealing member of each of Examples 1 to 10, the cross sections of inorganic material oblate particles 13 having an aspect ratio in a range from 0.15 to 0.5, inclusive, are oriented substantially in parallel with first plane 11A of sealing member 11, and inorganic material oblate particles 13 are scattered inside sealing member 11. Moreover, in the vicinity of the outer circumference of sealing member 11 as well as in the vicinity of two lead holes 12, the cross sections of inorganic material oblate particles 13 are oriented substantially perpendicularly to first plane 11A of sealing member 11, and inorganic material oblate particles 13 are scattered. For this reason, as clearly indicated by Table 2, in comparison with the aluminum electrolytic capacitor of Comparative Example 1 using a sealing member with no inorganic material oblate particles added thereto, the amount of permeation of the electrolytic solution is clearly reduced. Thus, it is possible to provide an aluminum electrolytic capacitor superior in reliability with long life at high temperatures.

Second Exemplary Embodiment

Figure 5A:
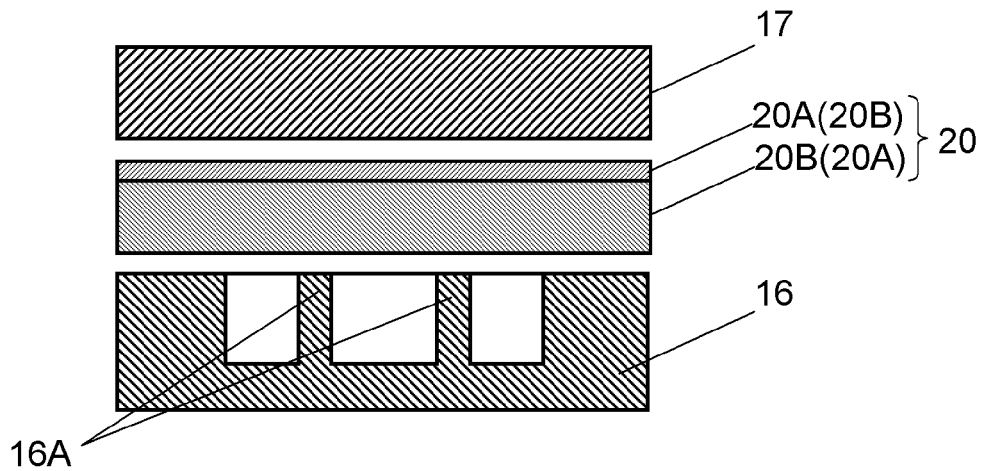
FIG. 5A is a schematic view showing a press molding step of a sealing member for a capacitor in accordance with each of embodiments 2 and 3 of the present invention.
Figure 5B:
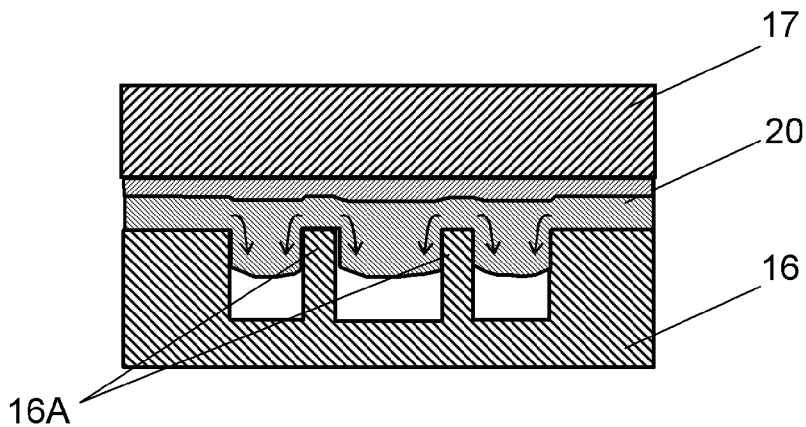
FIG. 5B is a schematic view showing a sequence of forming processes of the sealing member for a capacitor that follows the processes of FIG. 5A.
Figure 5C:
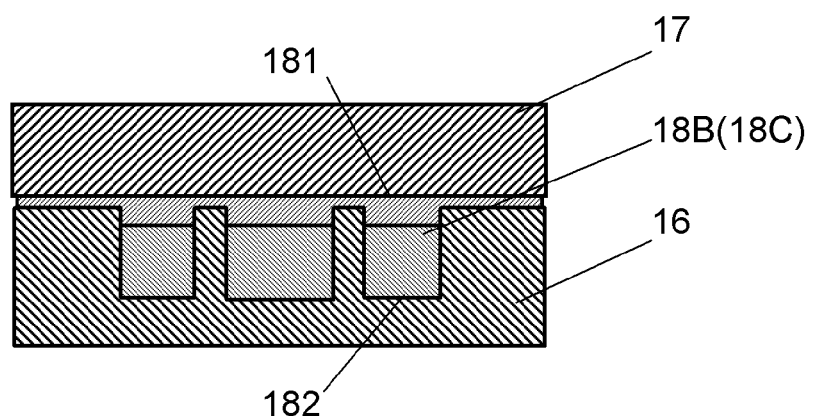
FIG. 5C is a schematic view showing a sequence of forming processes of the sealing member for a capacitor that follows the processes of FIG. 5B.

FIGS. 5A to 5C are schematic views that show a press-molding step of a sealing member 11 in accordance with the second exemplary embodiment of the present invention. The basic structure of an aluminum electrolytic capacitor in accordance with the present embodiment is the same as that of the first exemplary embodiment except for sealing member 11. In the present embodiment, in place of sheet 14 in the first exemplary embodiment, sheet 20, prepared by stacking two kinds of sheets 20A and 20B whose contents of inorganic material oblate particles 13 are different from each other, is used. As a result, the distributions of inorganic material oblate particles 13 in sealing members 11 are different. The other components are the same as those of the first exemplary embodiment.

Referring to FIGS. 5A to 5C, the following description will describe a method for preparing molded body 18B serving as a precursor of sealing member 11 in accordance with the present embodiment. First, as shown in FIG. 5A, lower mold 16 that has a cylindrical concave portion with two pins 16A protruding from its bottom surface, and upper mold 17 having a plane are used. Sheet 20, prepared by stacking sheet 20A having a thickness of 0.8 mm and sheet 20B having a thickness of 1.2 mm shown in Table 3, is placed between lower mold 16 and upper mold 17. At this time, the sheet 20 is disposed so that sheet 20B is placed on the lower mold 16 side and sheet 20A is placed on the upper mold 17 side.

TABLE 3

|  |  | Sheet 20A | Sheet 20B |
|---|---|---|---|
| Butyl rubber (IIR) |  | 100 | 100 |
| Alkyl phenol formaldehyde resin |  | 10 | 10 |
| Zinc oxide |  | 5 | 5 |
| Inorganic material oblate particles | Mica B | 20 | 40 |
|  | Mica D | 20 | 40 |
| Carbon black | FEF | 20 | 20 |
|  | SRF | 20 | 20 |
|  | FT | 20 | 20 |
| Stearic acid |  | 0.5 | 0.5 |

Next, as shown in FIG. 5B, sheet 20 located between upper mold 16 and lower mold 17 is press-molded. By carrying out the press-molding process, portions of sheet 20 are allowed to flow along the side walls of lower mold 16 as indicated by arrows.

In the flowing state of sheet 20, since sheet 20B faces lower mold 16, the amount of flow thereof into lower mold 16 is increased. For this reason, portions in which inorganic material oblate particles 13 are scattered such that flat surfaces thereof are oriented substantially perpendicularly to the plane of molded body 18B in the vicinity of the outer circumference of molded body 18A as well as in the vicinity of the two lead holes can be increased as compared with molded body 18A of the first exemplary embodiment.

As shown in FIG. 5C, sheet 20 is filled into the cylindrical shape of lower mold 16, and two holes are simultaneously formed in the cylindrical shape.

With respect to an aluminum electrolytic capacitor formed by using sealing member 11 thus molded and formed, the amount of permeation of an electrolytic solution is measured by using the method explained in the first exemplary embodiment so that a measured value of 59.8 is obtained; thus, the amount of permeation of the electrolytic solution can be suppressed more effectively than the aluminum electrolytic capacitor of the first exemplary embodiment. As a result, the rate of change in capacity of the aluminum electrolytic capacitor is suppressed to 8.9%, and the leak current is suppressed to 3 µA so that the characteristics can be improved.

Third Exemplary Embodiment

In the third exemplary embodiment of the present invention, sheet 20A as explained in the second exemplary embodiment by reference to Table 3 but having a thickness of 1.2 mm is placed on the lower mold 16 side, and sheet 20B as explained therein but having a thickness of 0.8 mm is placed on the upper mold 17 side. Except for this point, the same processes as those of the second exemplary embodiment are carried out as shown in FIGS. 5A to 5C so that molded body 18C is prepared, and sealing member 11 shown in FIG. 1 is manufactured.

In sealing member 11 thus molded and formed, the flowing distance of sheet 20B containing a larger amount of inorganic material oblate particles 13 is reduced and its disturbance in orientation is also made smaller. As a result, first plane 181 is allowed to contain a larger amount of inorganic material oblate particles 13 in comparison with second plane 182. In other words, a larger amount of inorganic material oblate particles 13 whose flat surfaces are made substantially in parallel with first plane 181 are placed in the vicinity of first plane 181.

For this reason, with respect to an aluminum electrolytic capacitor formed by using such sealing member 11 placed such that first plane 181 is located on the outside, the amount of permeation of an electrolytic solution is measured by using the method explained in the first exemplary embodiment so that a measured value of 58.4 is obtained. Thus, the amount of permeation of the electrolytic solution can be suppressed more effectively than the aluminum electrolytic capacitor of the second exemplary embodiment. As a result, the rate of change in capacity of the aluminum electrolytic capacitor is suppressed to 8.7%, and the leak current is suppressed to 2 µA so that the characteristics can be improved.

Fourth Exemplary Embodiment

Figure 6A:
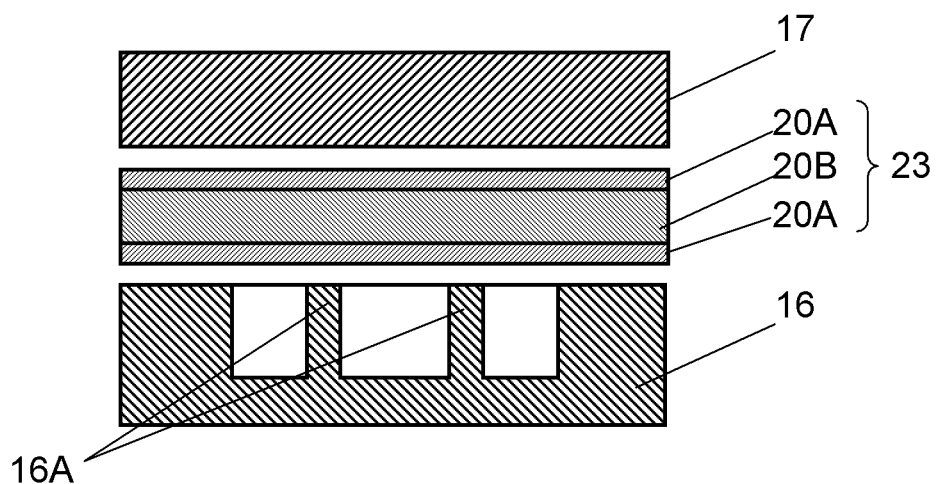
FIG. 6A is a schematic view showing a press molding step of a sealing member for a capacitor in accordance with a fourth exemplary embodiment of the present invention.
Figure 6B:
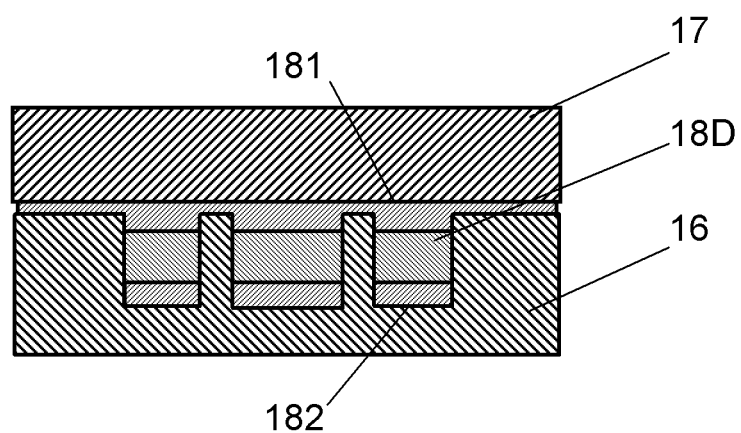
FIG. 6B is a schematic view showing a sequence of forming processes of the sealing member for a capacitor that follows the processes of FIG. 6A.

FIGS. 6A and 6B are schematic views that show a press-molding step in accordance with the fourth exemplary embodiment of the present invention. The basic structure of an aluminum electrolytic capacitor in accordance with the present embodiment is the same as that of the first exemplary embodiment except for sealing member 11. In the present embodiment, in place of sheet 14 in the first exemplary embodiment, sheet 23 having a structure in which sheet 20B having a greater content of inorganic material oblate particles 13 is sandwiched by sheets 20A having a smaller content of inorganic material oblate particles 13 is used in place of sheet 14 of the first exemplary embodiment. Except for this, the same processes as those of the first exemplary embodiment are carried out to prepare molded body 18D serving as a precursor of sealing member 11. In this case, the thickness of sheet 20A is 0.4 mm, and the thickness of sheet 20B is 1.2 mm. As a result, in molded body 18D, the center portion thereof in a direction perpendicular to first plane 181 (height direction) contains largest amount of inorganic material oblate particles 13.

With respect to an aluminum electrolytic capacitor formed by using sealing member 11 thus formed, the amount of permeation of an electrolytic solution is measured by using the method explained in the first exemplary embodiment so that a measured value of 57.6 is obtained; thus, the amount of permeation of the electrolytic solution can be suppressed more effectively than the aluminum electrolytic capacitor of the first exemplary embodiment. As a result, the rate of change in capacity of the aluminum electrolytic capacitor is suppressed to 8.5%, and the leak current is suppressed to 2 μA so that the characteristics can be improved.

Additionally, in the above explanation, sheet 23 having a structure in which sheet 20B having a greater content of inorganic material oblate particles 13 is sandwiched by sheets 20A having a smaller content of inorganic material oblate particles 13 is used. However, one of sheets 20A may be replaced by a sheet having a content of inorganic material oblate particles 13 that is different from that of sheet 20A, and is also smaller than that of sheet 20B. In other words, three kinds of sheets having different contents of inorganic material oblate particles may be stacked and used.

Fifth Exemplary Embodiment

Figure 7A:
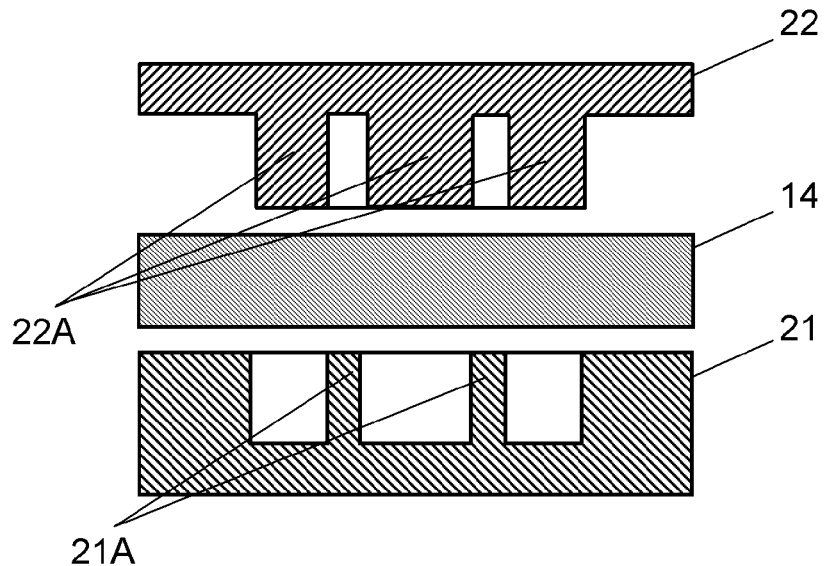
FIG. 7A is a schematic view showing a press molding step of a sealing member for a capacitor in accordance with a fifth exemplary embodiment of the present invention.
Figure 7B:
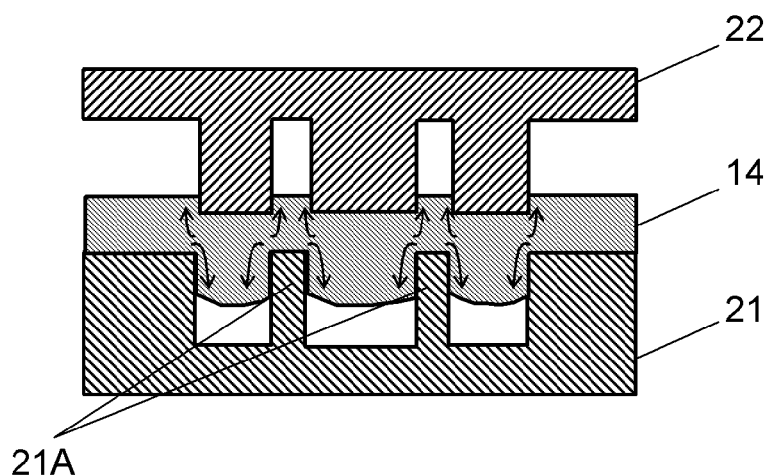
FIG. 7B is a schematic view showing a sequence of forming processes of the sealing member for a capacitor that follows the processes of FIG. 7A.

FIGS. 7A and 7B are schematic views that show a press-molding step of a sealing member 11 in accordance with the fifth exemplary embodiment of the present invention. The basic structure of an aluminum electrolytic capacitor in accordance with the present embodiment is the same as that of the first exemplary embodiment except for sealing member 11. In the present embodiment, in place of lower mold 16 and upper mold 17 in the first exemplary embodiment, lower mold 21 and upper mold 22 are used. Except for this, the same processes as those of the first exemplary embodiment are carried out.

Figure 7C:
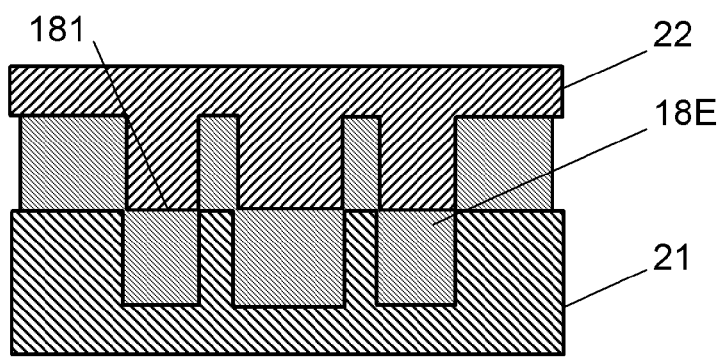
FIG. 7C is a schematic view showing a sequence of forming processes of the sealing member for a capacitor that follows the processes of FIG. 7B.

Referring to FIGS. 7A to 7C, the following description will describe a method for preparing molded body 18E serving as a precursor of sealing member 11 in accordance with the present embodiment. First, as shown in FIG. 7A, sheet 14 that has been roll-pressed is placed between lower mold 21 and upper mold 22. In lower mold 21, pins 21A protrudes from the bottom surface of a cylindrical concave portion. Upper mold 22 has protruding portion 22A corresponding to the cylindrical concave portion of lower mold 21. Lower mold 21 and upper mold 22 are preliminarily set to a predetermined temperature.

Next, as shown in FIG. 7B, sheet 14 between lower mold 21 and upper mold 22 is pressed. At this time, portions of sheet 14 are allowed to flow along the side walls of lower mold 21 and upper mold 22, as well as along pins 21A, as indicated by arrows. By this flowing process, in the vicinity of the outer circumference of molded body 18A as well as in the vicinity of the two lead holes of molded body 18E that has been press-molded, inorganic material oblate particles 13 are scattered such that flat surfaces of particles thereof are oriented substantially perpendicularly to first plane 181 of molded body 18E. Additionally, even when there are partially some portions of inorganic material oblate particles 13 in which the flat surfaces are not oriented substantially perpendicularly to first plane 181, but obliquely oriented, no influences are given to the characteristics.

In the press-molding of the present embodiment, upper mold 22, which has protruding portion 22A corresponding to the cylindrical concave portion of lower mold 21, with pins 21A protruding from the bottom surface of the concave portion, is used. For this reason, in the vicinity of the outer circumference of molded body 18E, the flat surfaces of inorganic material oblate particles 13 can be more uniformly oriented substantially perpendicularly to first plane 181 in comparison with those of the first exemplary embodiment.

With respect to an aluminum electrolytic capacitor formed by using sealing member 11 thus formed, the amount of permeation of an electrolytic solution is measured by using the method explained in the first exemplary embodiment so that a measured value of 59.2 is obtained; thus, the amount of permeation of the electrolytic solution can be suppressed more effectively than the aluminum electrolytic capacitor of the first exemplary embodiment. As a result, the rate of change in capacity of the aluminum electrolytic capacitor is suppressed to 8.6%, and the leak current is suppressed to 3 μA so that the characteristics can be improved.

Sixth Exemplary Embodiment

Figure 8A:
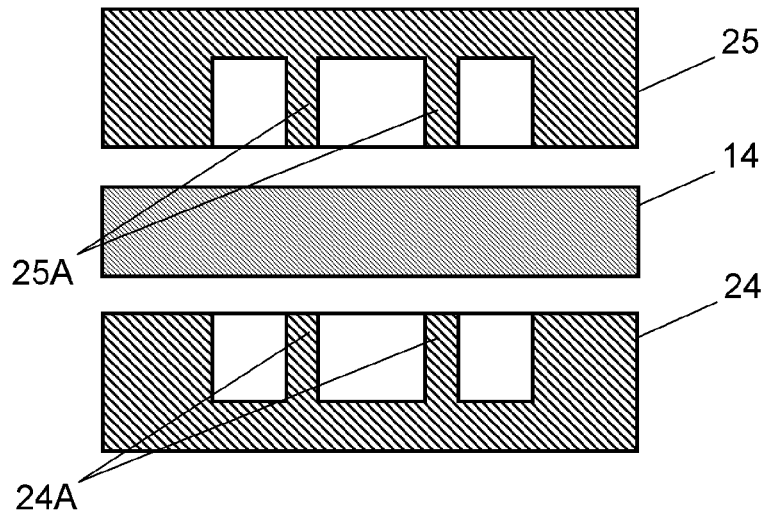
FIG. 8A is a schematic view showing a press molding step of a sealing member for a capacitor in accordance with a sixth exemplary embodiment of the present invention.
Figure 8B:
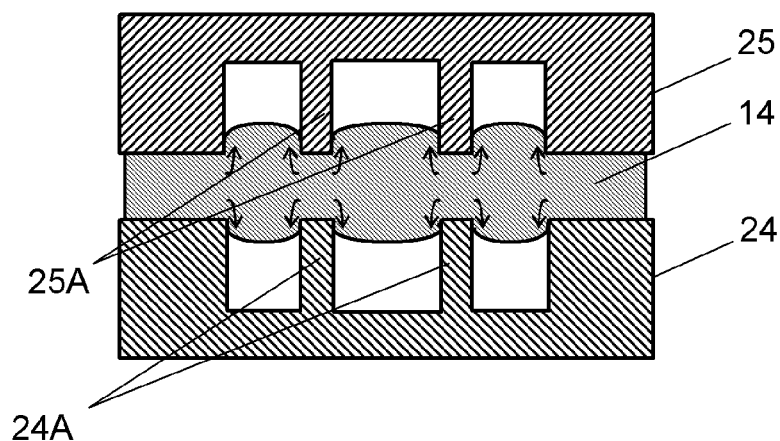
FIG. 8B is a schematic view showing a sequence of forming processes of the sealing member for a capacitor that follows the processes of FIG. 8A.

FIGS. 8A and 8B are schematic views that show a press-molding step of sealing member 11 in accordance with the sixth exemplary embodiment of the present invention. The basic structure of an aluminum electrolytic capacitor in accordance with the present embodiment is the same as that of the first exemplary embodiment except for sealing member 11. In the present embodiment, in place of lower mold 16 and upper mold 17 in the first exemplary embodiment, lower mold 24 and upper mold 25 are used. Except for this point, the same processes as those of the first exemplary embodiment are carried out.

Figure 8C:
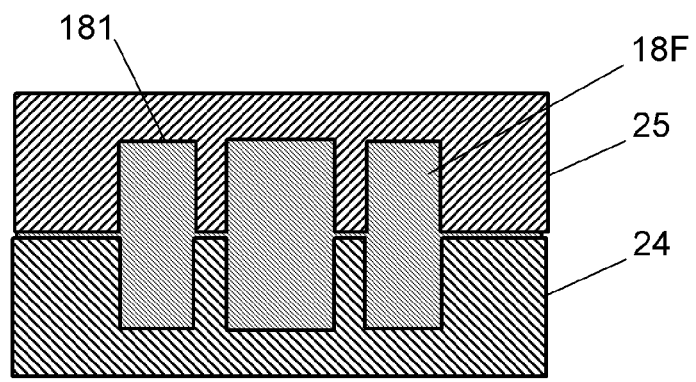
FIG. 8C is a schematic view showing a sequence of forming processes of the sealing member for a capacitor that follows the processes of FIG. 8B.

Referring to FIGS. 8A to 8C, the following description will describe a method for preparing molded body 18F serving as a precursor of sealing member 11 in accordance with the present embodiment. First, as shown in FIG. 8A, sheet 14 that has been roll-pressed is placed between lower mold 24 and upper mold 25. In the lower mold 24, pins 24A protrudes from the bottom surface of a cylindrical concave portion. In the upper mold 25 as well, pins 25A protrudes from the bottom surface of a cylindrical concave portion. Pins 24A and pins 25A are formed at such positions as to be abutted each other when lower mold 24 and upper mold 25 are combined with each other. Lower mold 24 and upper mold 25 are preliminarily set at a predetermined temperature.

Next, as shown in FIG. 8B, sheet 14 between lower mold 24 and upper mold 25 is pressed. At this time, portions of sheet 14 are allowed to flow along the side walls of lower mold 24 and upper mold 25, as well as along pins 24A and 25A, in longitudinal directions as indicated by arrows. By this flowing process, in the vicinity of the outer circumference of molded body 18E as well as in the vicinity of the two lead holes of molded body 18E that has been press-molded, inorganic material oblate particles 13 are scattered such that flat surfaces thereof are oriented substantially perpendicularly to first plane 181 of molded body 18E. In the present embodiment, since the flowing distance is made shorter and since its disturbance in orientation is smaller, the effects of these structures become more remarkable in comparison with those of the fifth exemplary embodiment. Meanwhile, even when there are partially some portions of inorganic material oblate particles 13 in which the flat surfaces are not oriented substantially perpendicularly to first plane 181, but obliquely oriented, no influences are given to the characteristics.

In the press-molding of the present embodiment, lower mold 24 in which pins 24A protrudes from the bottom surface of a cylindrical concave portion and upper mold 25 in which pins 25A protrudes from the bottom surface of a cylindrical concave portion are used. For this reason, in the vicinity of the outer circumference of molded body 18F, the flat surfaces of inorganic material oblate particles 13 can be more uniformly oriented substantially perpendicularly to first plane 181 in comparison with those of the first exemplary embodiment.

With respect to an aluminum electrolytic capacitor formed by using sealing member 11 thus formed, the amount of permeation of an electrolytic solution is measured by using the method explained in the first exemplary embodiment so that a measured value of 59.4 is obtained; thus, the amount of permeation of the electrolytic solution can be suppressed more effectively than the aluminum electrolytic capacitor of the first exemplary embodiment. As a result, the rate of change in capacity of the aluminum electrolytic capacitor is suppressed to 8.9%, and the leak current is suppressed to 3 μA so that the characteristics can be improved.

INDUSTRIAL APPLICABILITY

It is possible to provide an aluminum electrolytic capacitor with high reliability by sealing an opening of a metal case housing a capacitor element impregnated with an electrolytic solution with a sealing member in accordance with the present invention. This aluminum electrolytic capacitor can be utilized for various electronic apparatuses, and exerts high utility value in lead-free assembling processes.

| REFERENCE MARKS IN THE DRAWINGS | |
|---|---|
| 5, 6 | Lead wire |
| 5A | Joining portion |
| 5B | Lead-out portion |
| 11 | Sealing member |
| 11A, 181 | First plane |
| 11B, 182 | Second plane |
| 12 | Lead hole |
| 13 | Inorganic material oblate particles |
| 14, 20, 20A, 20B, 23 | Sheet |
| 15 | Butyl rubber |
| 16, 21, 24 | Lower mold |
| 16A, 21A, 24A, 25A | Pin |
| 17, 22, 25 | Upper mold |
| 18A, 18B, 18C, 18D, 18E, 18F | Molded body |
| 31 | Capacitor element |
| 32 | Anode foil |
| 33 | Cathode foil |
| 34 | Separator |
| 35 | Case |
| 36 | Exterior member |
| 111 | First portion |
| 211 | Second portion |

The invention claimed is:

1. A sealing member for a capacitor, the sealing member having a cylindrical shape which includes a circular first plane and a circular second plane opposite the first plane, being provided with two lead holes that penetrate the first and second planes, and containing butyl rubber and inorganic material oblate particles having flat surfaces;
the sealing member comprising:

a first portion in which the inorganic material oblate particles are scattered such that the flat surfaces of the inorganic material oblate particles are oriented substantially in parallel with the first plan; and
a second portion in which the inorganic material oblate particles are scattered such that the flat surfaces of the inorganic material oblate particles are oriented substantially perpendicularly to the first plane, the second portion being located in the vicinity of an outer circumference of the sealing member as well as in the vicinity of the two lead holes.

2. The sealing member for a capacitor according to claim 1, wherein the first plane contains a larger amount of the inorganic material oblate particles than the second plane.

3. The sealing member for a capacitor according to claim 1, wherein the sealing member contains a largest amount of the inorganic material oblate particles at a center portion in a direction perpendicular to the first plane.

4. The sealing member for a capacitor according to claim 1, wherein an average particle size of the inorganic material oblate particles measured by a laser diffraction method ranges from 10 μm to 50 μm, inclusive, and an aspect ratio of the inorganic material oblate particles measured by scanning electron microscopy (SEM) observation ranges from 0.15 to 0.43, inclusive.

5. The sealing member for a capacitor according to claim 1, wherein the sealing member further contains silane-coupling-treated inorganic filler.

6. An aluminum electrolytic capacitor comprising:
a capacitor element having:
an anode foil to which a lead wire is joined;
a cathode foil to which a lead wire is joined; and
a separator interposed between the anode foil and the cathode foil,
wherein the capacitor element is formed by winding the anode foil, the cathode foil and the separator;
an electrolytic solution with which the capacitor element is impregnated;
a cylindrical metal case having a bottom and an opening, and housing the capacitor element together with the electrolytic solution therein; and
a sealing member sealing the opening of the case,
wherein the sealing member has a cylindrical shape which includes a circular first plane and a circular second plane opposite the first plane, and is provided with two lead holes that penetrate the first and second planes, the lead wires are respectively inserted through the two lead holes, and the sealing member contains butyl rubber and inorganic material oblate particles having flat surfaces;
the sealing member comprises:
a first portion in which the inorganic material oblate particles are scattered such that the flat surfaces of the inorganic material oblate particles are oriented substantially in parallel with the first plane; and
a second portion in which the inorganic material oblate particles are scattered such that the flat surfaces of the inorganic material oblate particles are oriented substantially perpendicularly to the first plane, the second portion being located in the vicinity of an outer circumference of the sealing member as well as in the vicinity of the two lead holes.

* * * * *